United States Patent [19]

Kaminow et al.

[11] 4,111,525
[45] Sep. 5, 1978

[54] SILICA BASED OPTICAL FIBER WAVEGUIDE USING PHOSPHORUS PENTOXIDE AND GERMANIUM DIOXIDE

[75] Inventors: Ivan Paul Kaminow, Tinton Falls; Herman Melvin Presby, Highland Park, both of N.J.

[73] Assignee: Bell Telephone Laboratories, Incorporated, Murray Hill, N.J.

[21] Appl. No.: 731,786

[22] Filed: Oct. 12, 1976

[51] Int. Cl.² .............................................. G02B 5/14
[52] U.S. Cl. ............................ 350/96.31; 350/96.34
[58] Field of Search ........ 350/96 GN, 96 WG, 96 M, 350/96.31, 96.34

[56] References Cited

U.S. PATENT DOCUMENTS

| | | | |
|---|---|---|---|
| 4,009,014 | 2/1977 | Black et al. | 350/96 WG X |
| 4,025,156 | 5/1977 | Gloge et al. | 350/96 GN X |
| 4,033,667 | 7/1977 | Fleming, Jr. | 350/96 WG |
| 4,057,320 | 11/1977 | Marcatili | 350/96 GN |

*Primary Examiner*—John K. Corbin
*Assistant Examiner*—John D. Lee
*Attorney, Agent, or Firm*—Daniel D. Dubosky

[57] ABSTRACT

An optical fiber waveguide is disclosed wherein germanium dioxide ($GeO_2$) and phosphorus pentoxide ($P_2O_5$) are radially graded in the core of the optical fiber for the purpose of achieving minimum modal dispersion over a broad range of wavelengths. The phosphorus pentoxide has its maximum concentration on the axis of the fiber core and is graded to zero concentration at the core-cladding interface. The germanium dioxide has its maximum concentration at the core-cladding interface, is constant throughout the cladding and is graded to zero concentration on the axis of the fiber core. The ratio of maximum $P_2O_5$ to maximum $GeO_2$ is approximately 11.6 and therefore the numerical aperture is only slightly degraded as a result of the reverse doping of germanium dioxide.

5 Claims, 3 Drawing Figures

SILICA BASED OPTICAL FIBER WAVEGUIDE USING PHOSPHORUS PENTOXIDE AND GERMANIUM DIOXIDE

BACKGROUND OF THE INVENTION

This invention relates to optical fiber waveguides and more particularly to optical fiber waveguides wherein two dopants are radially graded in a silica based fiber for the purpose of achieving minimum modal dispersion over a broader range of wavelengths than is possible with only one dopant.

It has been known in the prior art that modal dispersion in a multimode optical fiber can be minimized by radially grading the refractive index in the core of the fiber, see the article entitled "Light Propagation in Generalized Lens-Like Media" By S. E. Miller *Bell System Technical Journal,* Vol. 44, page 2017, 1965. To achieve this minimum modal dispersion it has been established that the refractive index should be graded in accordance with the following equation:

$$n(r) = n_c(1 + f(r))$$

where $n(r)$ is the index at radius $r$ from the axis and $n_c$ is the refractive index at the core-cladding interface. The function $f(r)$ has a form provided by the following equation:

$$f(r) = \begin{cases} \Delta[1 - (r/a)^\alpha], & r < a \\ 0, & r \geq a \end{cases}$$

where $\Delta$ is the relative index difference given in terms of the following equation:

$$\Delta = \frac{n(0) - n_c}{n_c} = \frac{\Delta n(0)}{n_c}$$

in which $n(0)$ is the refractive index value at $r = 0$, and $\alpha$ is an exponent that was found to deviate from 2 by a term in the order of $\Delta$ in order to provide minimum modal dispersion. This value of the exponent was described by D. C. Gloge and E. A. J. Marcatili in their U.S. Pat. No. 3,823,997 issued July 16, 1974.

It was subsequently determined that the dispersion of the index of refraction should be taken into account in order to achieve minimum modal dispersion. Under these circumstances it was determined that the shape of the index profile still follows a near parabolic shape but the exponent $\alpha$ was determined to deviate from 2 by an amount 2P which may be substantially larger than the relative index difference $\Delta$. This determination is set forth by D. B. Keck and R. Olshansky in their U.S. Pat. No. 3,904,268 issued Sept. 9, 1975. Their precise expression for the optimum $\alpha$ is as follows:

$$\alpha = 2 - 2P - \Delta \frac{(4 - 2P)(3 - 2P)}{(5 - 4P)}.$$

The magnitude of the contribution of the third term having $\Delta$ as a coefficient is determined to be small (in the order of 0.01) and this term may therefore be ignored since it is difficult to take into account experimentally at the present time. Hence, the optimum $\alpha$ for minimum modal dispersion is approximately equal to (2−2P) where the profile dispersion P is defined by the following equation:

$$P(\lambda) = \frac{n(0)}{N(0)} \cdot \frac{\lambda \Delta'}{\Delta}.$$

Inasmuch as the group index N deviates from $n$ by less than 1 percent it can also be assumed that N equals $n$ and the profile dispersion may be expressed in terms of the following equation:

$$P = \frac{\lambda \Delta'}{\Delta} = \lambda \left( \frac{\Delta n'}{\Delta n} - \frac{n_c'}{n_c} \right).$$

The refractive index profile is generally achieved in a multimode fiber by varying the concentration of an added dopant as a function of radius $r$. See for example, the U.S. Pat. No. 4,033,667 entitled "Multimode Optical Fiber" issued July 5, 1977 to J. W. Fleming wherein it is proposed that phosphorus pentoxide and boron oxide be added to a silica based fiber in order to achieve minimum modal dispersion at a single wavelength and increased numerical aperture.

In U.S. Pat. No. 4,025,156 entitled "Graded Index Fiber for Multimode Optical Communications" by D. C. Gloge et al, issued May 24, 1977 germanium dioxide and boron oxide are radially graded in the core of a multimode fiber in order to achieve minimum modal dispersion over a broad range of wavelengths. These two dopants germanium dioxide and boron oxide when properly graded in a single fiber produce a fiber whose optimum $\alpha$ versus wavelength curve has substantially zero slope over a broad range of wavelengths. As a result, a fiber of this type can be installed for use at one wavelength and later used at a much different wavelength without introducing any loss due to modal dispersion. Unfortunately, boron oxide may have an unpredictable effect on the refractive index of the host glass even in small concentrations. As a result, the addition of boron oxide produces a reduction in the refractive index that can vary nonlinearly with concentration and can also vary strongly with the thermal history of the glass. Hence, boron oxide is not as predictable in its behavior as one would like in order to design fibers having reproducible performance in their qualities of modal dispersion.

SUMMARY OF THE INVENTION

It is a primary object of the present invention to achieve minimum modal dispersion over a broad range of wavelengths without being restricted to an index decreasing dopant such as boron oxide. It is also an object of the present invention to achieve this minimum modal dispersion over a broad range of wavelengths by using two dopants that are very predictable and reproducible in their index varying characteristics.

These objects and others are achieved in accordance with the present invention wherein two index-increasing dopants, phosphorus pentoxide ($P_2O_5$) and germanium dioxide ($GeO_2$), are radially graded in the core of a multimode silica ($SiO_2$) fiber in order to achieve minimum modal dispersion over a broad range of wavelengths. The phosphorus pentoxide has a maximum molar concentration on the axis of the fiber core and is radially graded to zero at the core-cladding interface. The germanium dioxide on the other hand has zero concentration on the axis of the fiber core and is radially graded to a maximum concentration at the core-cladding interface. Minimum modal dispersion is achieved over a range of wavelengths in the neighborhood of a central wavelength of 0.8 microns with a ratio of maximum $P_2O_5$ concentration to maximum $GeO_2$ concentration of approximately 11.6. As a result of the small amount of $GeO_2$ required, the numerical aperture is degraded only slightly by the presence of the index-increasing dopant $GeO_2$ with maximum concentration at the core-cladding interface. For other central wavelengths, the concentration rate may differ from 11.6.

BRIEF DESCRIPTION OF THE DRAWING

The invention will be readily understood after reading the following detailed description in conjunction with the drawings wherein.

DETAILED DESCRIPTION

Figure 1:
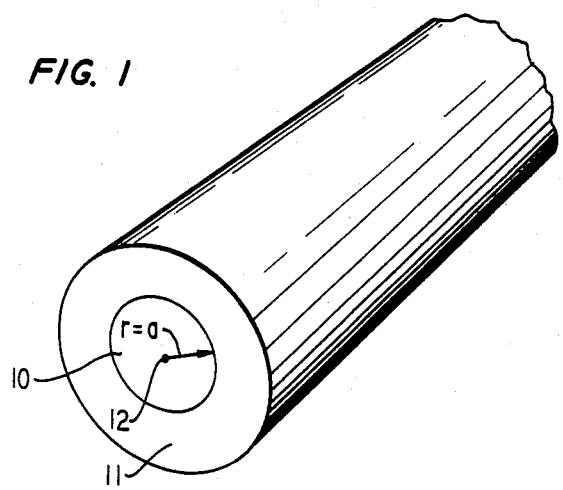
FIG. 1 is a pictorial illustration of a multimode optical fiber constructed in accordance with the present invention.

As pointed out hereinabove the optimum $\alpha$ which must be achieved for minimum modal dispersion is to a first order approximation a function solely of the profile dispersion P. As also indicated hereinabove, this profile dispersion is a function solely of the wavelength, the index difference between the axis and the cladding, the derivative of this index difference with respect to wavelength, and the index of refraction for the cladding ($n_c$) and its derivative with respect to wavelength. To achieve minimum modal dispersion over a broad range of wavelengths it is necessary to achieve both optimum $\alpha$ at the center wavelength of operation and also to achieve a rate of change of $\alpha$ with respect to wavelength ($d\alpha/d\lambda$) equal to zero at this wavelength. For a first order approximation, $d\alpha/d\lambda = 0$ can be achieved by establishing the conditions which cause the rate of change of the profile dispersion P with respect to wavelength to be equal to zero. In short, minimum modal dispersion over a broad range of wavelengths can be achieved by satisfying the following equation:

$$\alpha'(\lambda_1) = -2P'(\lambda_1) = 0 \quad (1)$$

where the prime indicates derivative with respect to wavelength, and $$P(\lambda) = \frac{\Delta n'}{\Delta n} + \lambda \left[ \frac{\Delta n''}{\Delta n} - \left(\frac{\Delta n'}{\Delta n}\right)^2 \right] - D(\lambda) \quad (2)$$

with $$D(\lambda) = \frac{n_c'}{n_c} + \lambda \left[ \frac{n_c''}{n_c} - \left(\frac{n_c'}{n_c}\right)^2 \right]. \quad (3)$$

If the dopants which are to be added to the optical fiber are linear in that the change in index that they produce is proportional to the change in concentration, and furthermore if there is a minimum effect from the nonlinear terms that arise due to the interaction of the two dopants, the change in the index $\Delta n$ between the axis of the fiber core and the core-cladding interface can be expressed in terms of the following equation:

$$\Delta n(\lambda_1) = n_c \Delta(\lambda_1) = \Delta g_2 \Gamma_{21}(\lambda_1) + \Delta g_3 \Gamma_{31}(\lambda_1), \quad (4)$$

where $\Delta g_2$ and $\Delta g_3$ are the changes in concentration (expressed as a mole fraction) between the axis of the core and the core-cladding interface for the second and third components (which are the first and second dopants), and $\Gamma_{21}$ and $\Gamma_{31}$ are measured parameters for the second and third components relative to the primary component such as silicon dioxide. These measured components $\Gamma_{21}$ and $\Gamma_{31}$ are obtained from measurements of the change in the index of refraction versus concentration and wavelength for each of the individual dopants separately added to a silica based fiber. (See paper by H. M. Presby and I. P. Kaminow "Refractive Index and Profile Dispersion Measurements in Binary Silica Optical Fibers" *Applied Optics*, Volume 15, December 1976, pages 3029–3036.) Typical values obtained for these parameters at a wavelength of 0.8 microns, and their first and second derivatives with respect to wavelength for $GeO_2$ and $P_2O_5$ in $SiO_2$ are as follows:

| $GeO_2/SiO_2$ | $P_2O_5/SiO_2$ |
|---|---|
| $\Gamma_{21} = 0.124$ | $\Gamma_{31} = 0.097$ |
| $\Gamma_{21}' = -0.0069 \mu m^{-1}$ | $\Gamma_{31}' = 0.0029 \mu m^{-1}$ |
| $\Gamma_{21}'' = 0.056 \mu m^{-2}$ | $\Gamma_{31}'' = 0.0032 \mu m^{-2}$ |

If the fiber is to be a waveguiding fiber, $\Delta n$ must be greater than zero. The requirement that the derivative of $\alpha$ with respect to wavelength be equal to zero results in the following required equality:

$$\Delta n(\Delta n' + \lambda_1 \Delta n'') - \lambda_1 (\Delta n')^2 - (\Delta n)^2 D = 0. \quad (5)$$

If $\gamma$ represents the ratio of the changes in concentration of the third element and the second element, that is $\gamma = \Delta g_3/\Delta g_2$, the required equality (5) to achieve the desired broad band condition can be expressed in terms of the following quadratic equation in $\gamma$:

$$c_0 + c_1 \gamma + c_2 \gamma^2 = 0 \quad (6)$$

where the coefficients can be expressed in terms of the following equations:

$$c_0 = (\Gamma_{21}\Gamma_{21}' - D\Gamma_{21}^2) + \lambda_1(\Gamma_{21}\Gamma_{21}'' - \Gamma_{21}'^2) \quad (7)$$

$$c_1 = (\Gamma_{31}\Gamma_{21}' + \Gamma_{21}\Gamma_{31}' - 2D\Gamma_{21}\Gamma_{31}) + \lambda_1(\Gamma_{31}\Gamma_{21}'' + \Gamma_{21}\Gamma_{31}'' - 2\Gamma_{21}'\Gamma_{31}') \quad (8)$$

$$c_2 = (\Gamma_{31}\Gamma_{31}' - D\Gamma_{31}^2) + \lambda_1(\Gamma_{31}\Gamma_{31}'' - \Gamma_{31}'^2) \quad (9)$$

all of the parameters having their values taken at the wavelength of operation $\lambda = \lambda_1$.

Using the parameters for $\Gamma_{21}$, $\Gamma_{31}$ and their derivatives set forth in the table hereinabove, a computer generated solution of the quadratic equations yields two values for $\gamma$, $-1.24$ or $-11.6$. According to equation 4 these values give the following values for the index difference: $\Delta n(0.8) = (2.74 \times 10^{-3})\Delta g_2$ and $-(1.00)\Delta g_2$ with values of $\alpha$ of 8.07 and 1.92, respectively, where $\Delta g_2$ is the maximum mole fraction differential concentration of germanium dioxide in the optimized ternary glass. The first solution corresponding to $\gamma = -1.24$, results in a much smaller $\Delta n$ than would be practical in terms of numerical aperture. This first solution also results in a very large $\alpha$. The second solution corresponding to the value of $\gamma = -11.6$ gives a physically more satisfying result in terms of a reasonable $\Delta n$ and in terms of an $\alpha$ parameter approximately equal to 2. Taking into consideration the facts that germanium dioxide produces an approximate linear increase in refractive index for concentrations up to about 20 molar percent and phosphorus pentoxide produces a linear increase up to about 15 percent, physically satisfying results can be achieved by setting $\Delta g_2 = -0.010$. This, of course, corresponds to a negative grading in concentration in that the maximum concentration of germanium dioxide appears at the core-cladding interface. With $\gamma = -11.6$, and $\Delta g_2 = -0.01$, the change in concentration of phosphorus pentoxide $\Delta g_3$ has a value of about $+0.12$. This value of 12 percent phosphorus pentoxide with a maximum concentration on the axis of the fiber core is well within the linearity range for this particular dopant. In addition, it is possible to realize a 12 percent $P_2O_5$ concentration in practical fiber.

Figure 2:
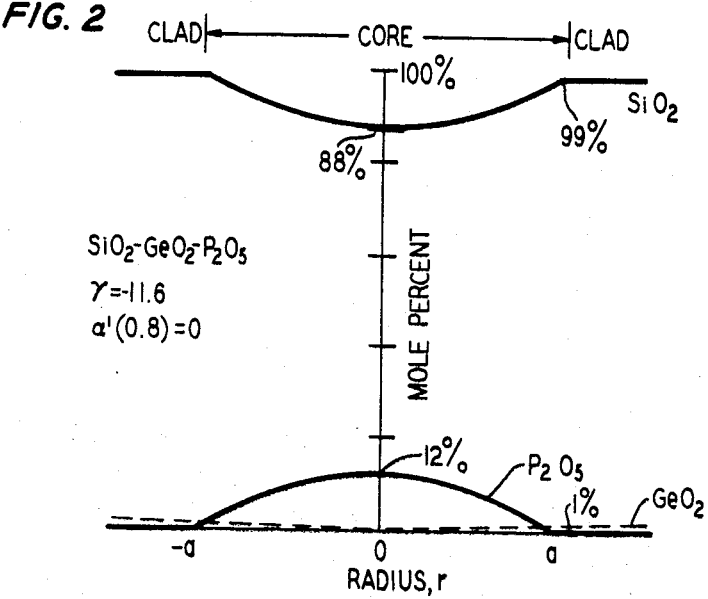
FIG. 2 is a graph of the molar concentration versus radius for the primary element silicon dioxide and the two dopants, phosphorus pentoxide and germanium dioxide.

These values obtained for the various differential dopant concentrations can be utilized in an optical fiber of the type shown in FIG. 1 of the drawings. In FIG. 1 a core 10 is surrounded by a cladding 11 having a lower index of refraction than the material provided in core 10. The dopants added to core 10 of the optical fiber are graded in accordance with the curves shown in FIG. 2 of the drawings. Radius equal to 0 corresponds to the geometrical center 12 of the optical fiber core. As indicated in FIG. 2 a suitable set of concentration profiles have values of 88, 0 and 12 molar percent for silicon dioxide, germanium dioxide and phosphorus pentoxide, respectively, on the axis of the fiber. At the core-cladding interface where $r = a$, the molar concentrations for silicon dioxide, germanium dioxide and phosphorus pentoxide are set equal to 99, 1 and 0 percent, respectively. All three concentration profiles are caused to change in accordance with the profile function $(1-(r/a)^{1.92})$. As indicated in FIG. 2, the value of the molar concentration for $GeO_2$ is a maximum at the core-cladding interface, and this value should be continued for some distance into the cladding material.

It would be desirable to increase $\Delta n$ still further and thereby increase the numerical aperture. By increasing $\Delta g_2$ and $\Delta g_3$ minimum modal dispersion will still be achieved over a broad range of wavelengths providing the ratio of these concentrations (designated hereinabove as $\gamma$) is maintained at a value of approximately $-11.6$. At present, however, it is difficult to incorporate more than 14 molar percent of $P_2O_5$ because of its volatility at high temperatures.

Figure 3:
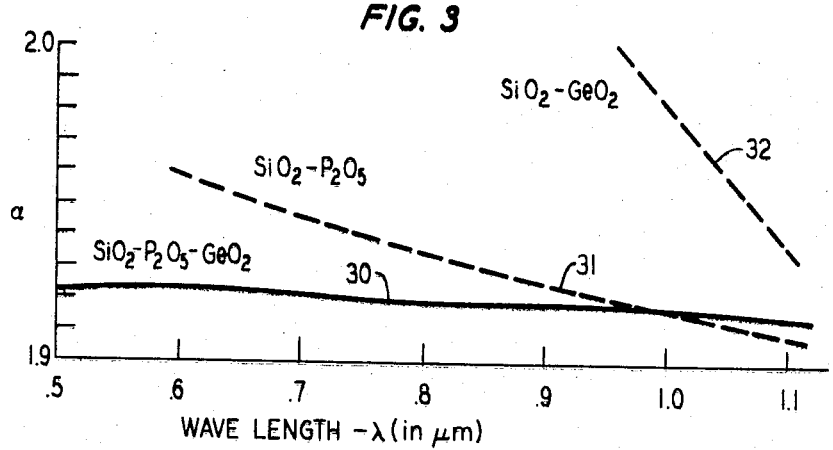
FIG. 3 is a graph of $\alpha$ versus wavelength for an optical fiber constructed in accordance with the present invention and also for fibers using only single dopants.

The advantageous results achieved in accordance with the present invention are illustrated by the computed curves in FIG. 3 of the drawings wherein the $\alpha$ achieved by the dopants for various wavelengths is shown for both the present invention and for prior art fibers in which a single dopant is used. In FIG. 3 curve 30 indicates the $\alpha$ achieved using the doping concentrations shown in FIG. 2 for both $P_2O_5$ and $GeO_2$. As indicated by curve 30, this $\alpha$ is relatively constant over a broad range of wavelengths extending from 0.5 to 1.1 microns. The flatness of this curve is far superior to that of curves 31 and 32 in FIG. 3 which illustrate the $\alpha$ values achieved using single dopants of $P_2O_5$ or $GeO_2$, respectively. In spite of the fact that both these dopants when used individually produce a curve of optimum $\alpha$ versus wavelength having a negative slope, these dopants when combined in accordance with the present invention result in a curve of optimum $\alpha$ versus wavelength which is relatively constant over a broad range of wavelengths. This advantageous effect has been achieved by reverse grading the $GeO_2$ with a maximum concentration of the index-increasing dopant at the core-cladding interface. Advantageously the amount of this dopant needed to provide the desired result is only about 1/12 of the concentration of $P_2O_5$ on the axis of the fiber, and therefore the numerical aperture is degraded only slightly in achieving minimum modal dispersion over a broader range of wavelengths.

What is claimed is:

1. An optical fiber waveguide comprising a silica based fiber core surrounded by a cladding having an index of refraction lower in value than that of said core, and first and second dopants radially graded in concentration within said core, characterized in that said first dopant is an index-increasing dopant radially graded such that it appears with maximum molar concentration on the axis of said core and minimum molar concentration at the core-cladding interface, and said second dopant is an index-increasing dopant radially graded such that it appears with maximum molar concentration at the core-cladding interface and with minimum molar concentration on the axis of said fiber core.

2. An optical fiber waveguide as defined in claim 1 wherein said first dopant is phosphorus pentoxide and said second dopant is germanium dioxide.

3. An optical fiber waveguide as defined in claim 2 wherein the ratio of the change in concentration of phosphorus pentoxide to the change in concentration of germanium dioxide is equal to approximately 12.

4. An optical fiber waveguide as defined in claim 3 wherein said first and second dopants are radially graded in accordance with concentration profiles that approximately follow the form $[1 - (r/a)^{1.92}]$.

5. An optical fiber waveguide as defined in claim 2 wherein the maximum molar concentration of phosphorus pentoxide is approximately equal to 12 molar percent and the minimum molar concentration of phosphorus pentoxide is equal to zero, and the maximum molar concentration of germanium dioxide is approximately equal to 1 percent and the minimum molar concentration of germanium dioxide is equal to zero.

* * * * *